(12) United States Patent
Shinozaki et al.

(10) Patent No.: US 9,256,287 B2
(45) Date of Patent: Feb. 9, 2016

(54) TACTILE SENSATION PROVIDING APPARATUS

(75) Inventors: Takayuki Shinozaki, Yokohama (JP); Makoto Tomizu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/241,832

(22) PCT Filed: Aug. 30, 2012

(86) PCT No.: PCT/JP2012/005475
§ 371 (c)(1),
(2), (4) Date: Feb. 27, 2014

(87) PCT Pub. No.: WO2013/031224
PCT Pub. Date: Mar. 7, 2013

(65) Prior Publication Data
US 2014/0225831 A1 Aug. 14, 2014

(30) Foreign Application Priority Data
Aug. 30, 2011 (JP) ................................. 2011-187896

(51) Int. Cl.
*G06F 3/01* (2006.01)
*G06F 3/0489* (2013.01)
*G06F 3/0485* (2013.01)

(52) U.S. Cl.
CPC .............. *G06F 3/016* (2013.01); *G06F 3/0485* (2013.01); *G06F 3/04892* (2013.01)

(58) Field of Classification Search
CPC ..... G06F 3/0488; G06F 3/016; G06F 3/0485; G06F 3/04892
See application file for complete search history.

(56) References Cited

U.S. PATENT DOCUMENTS

| 8,334,840 | B2 * | 12/2012 | Serafin et al. | 345/156 |
| 8,466,889 | B2 * | 6/2013 | Tong et al. | 345/173 |
| 8,917,244 | B2 * | 12/2014 | Grothe | 345/173 |
| 2006/0109256 | A1 | 5/2006 | Grant et al. | |

FOREIGN PATENT DOCUMENTS

| JP | 07-191803 A | 7/1995 |
| JP | 2003-241898 A | 8/2003 |
| JP | 2004-328087 A | 11/2004 |
| JP | 2008-516348 A | 5/2008 |
| JP | 2009-075994 A | 4/2009 |

OTHER PUBLICATIONS

International Search Report; PCT/JP2012/005475; Sep. 25, 2012.
Japanese Office Action, JP2013-531103, Jan. 21, 2014.

\* cited by examiner

*Primary Examiner* — Abbas Abdulselam
(74) *Attorney, Agent, or Firm* — Studebaker & Brackett PC

(57) ABSTRACT

The tactile sensation providing apparatus 1 includes a contact detection unit 40, a tactile sensation providing unit 50 for providing a tactile sensation to the contacting object contacting the contact detection unit 40, a display unit 30 for displaying an input area and a cursor, and a control unit 10 for controlling the display unit 30. The cursor is moved based on the detected contact and the portion of the displayed input area is displaced based on the movement of the cursor. The control unit 10 controls to cause a first tactile sensation to be provided when the portion of the input area is displaced as the cursor is moved, and a second tactile sensation to be provided when the edge of the input area is displayed as the portion of the input area is displaced, thereby notifying the operator of the results of the operation.

6 Claims, 7 Drawing Sheets

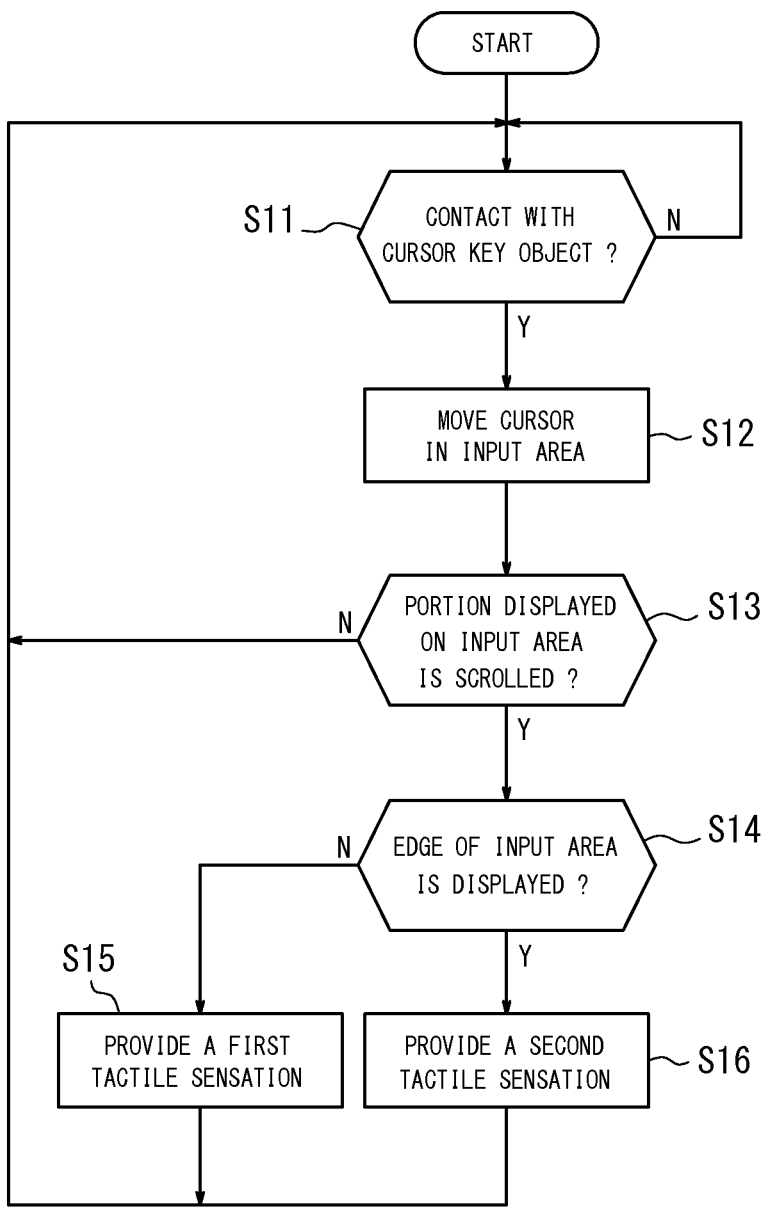

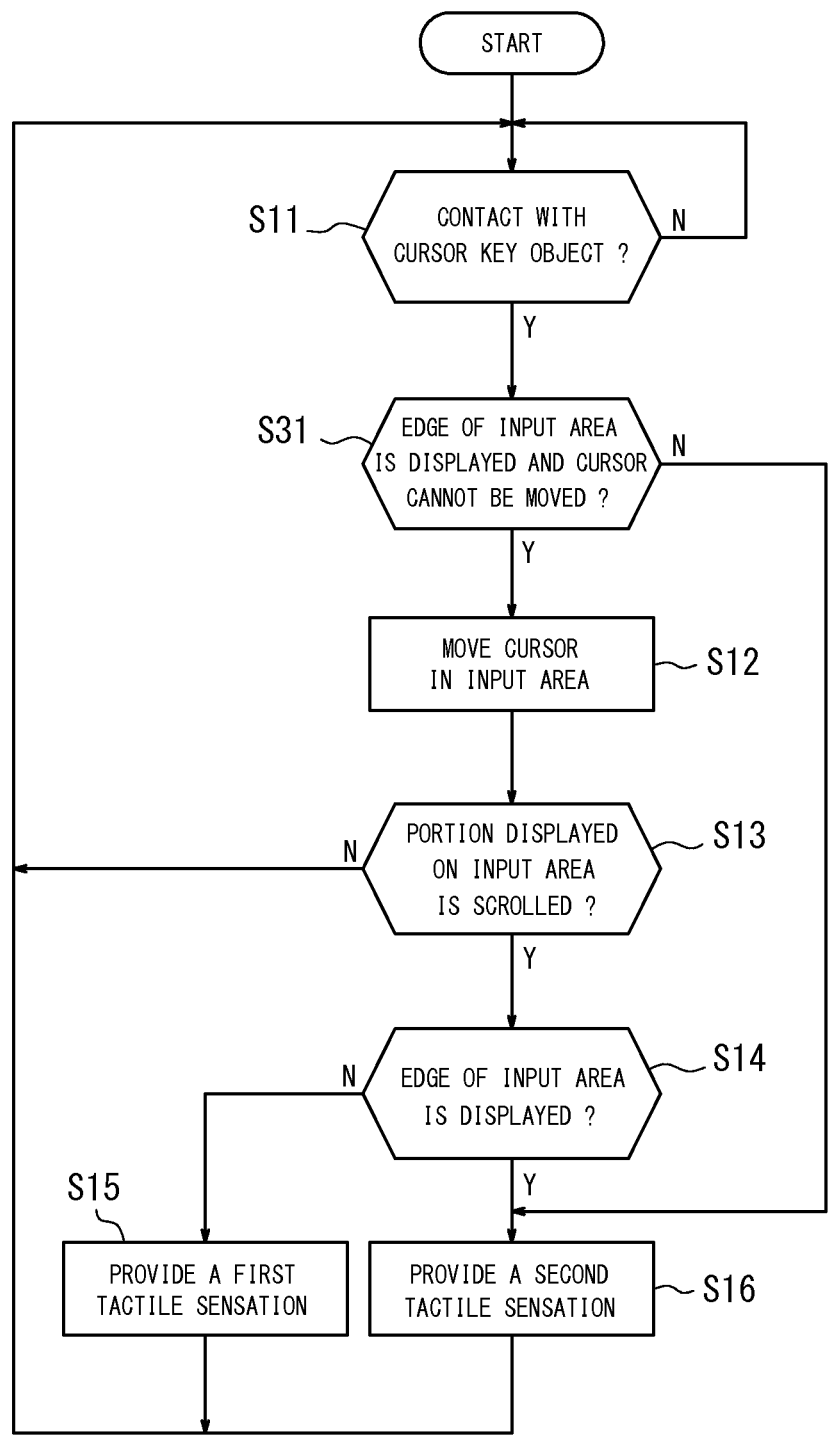

TACTILE SENSATION PROVIDING APPARATUS

CROSS REFERENCE TO RELATED APPLICATION

This application claims priority and the benefit of Japanese Patent Application No. 2011-187896 filed on Aug. 30, 2011, the entire contents of which are incorporated herein by reference.

FIELD

The present invention relates to a tactile sensation providing apparatus and, more particularly, to a tactile sensation providing apparatus that provides a tactile sensation based on the operation by an operator.

BACKGROUND

In recent years, in mobile terminals such as mobile phones, as a member that detects the contact by the operator, an electronic device with a touch sensor such as a touch panel and a touch switch is increasing. Furthermore, besides mobile terminals, electronic devices having a touch sensor such as devices such as calculators and ticket vending machines, home appliances such as microwaves, TV sets and lighting equipment, and industrial equipment (FA equipment) are widely used.

A variety of touch sensors have been proposed so far (see, for example, Patent Literature 1). Patent Literature 1 proposes an analog type resistive film touch panel that can be produced at a low cost and can be miniaturized. The touch panel described in Patent Literature 1 is configured using two conductive films slightly spaced by a spacer therebetween. In this touch panel, when the conductive films are pushed and come in contact each other, based on the voltage gradient applied to one conductive film, the position of the contact is read as a voltage by the other conductive film.

As such a touch sensor, in addition to a resistive film type, a variety of types such as a capacitive type and an optical type are known. These types of touch sensors detect a contact by the operator's finger, a stylus pen and the like. An electronic device with a touch sensor generally displays images such as operation keys and buttons (hereinafter referred to as "object") on a display unit such as a liquid crystal display disposed on the back face side of the touch sensor. When the operator executes operation of contacting the object displayed on the display unit, the contact on the position corresponding to the object is detected by a touch sensor.

In an electronic device with such a touch panel, according to the application software (hereinafter simply referred to as "application") to be used, a variety of user interfaces can be configured by displaying a variety of objects. Thus, in an electronic device with a touch sensor, a variety of user interfaces can be configured at a high degree of freedom. Such an electronic device is easy to operate and user friendly, and thus an electronic device with a touch sensor has rapidly spread.

CITATION LIST

Patent Literature 1: JP2003241898 A

SUMMARY

A tactile sensation providing apparatus according to a first aspect of the invention includes:
a contact detection unit configured to detect a contact by a contacting object;
a tactile sensation providing unit configured to provide a tactile sensation to the contacting object in contact with the contact detection unit;
a display unit configured to display an input area in which a character is input and a cursor; and
a control unit configured to control the display unit so that a position of the cursor is moved based on the contact detected by the contact detection unit and a portion of the input area displayed on the display unit is scrolled, in which
the control unit controls the tactile sensation providing unit so that a first tactile sensation is provided when a portion of the input area displayed on the display unit is displaced as the position of the cursor is moved, and a second tactile sensation different from the first tactile sensation is provided when an edge of the input area is displayed on the display unit as the portion of the input area displayed on the display unit is displaced.

According to a second aspect of the invention, in the tactile sensation providing apparatus according to the first aspect, the control unit controls the tactile sensation providing unit so that, when the position of the cursor is moved without displacing of the portion of the input area displayed on the display unit, a third tactile sensation different from the first or the second tactile sensation is provided.

According to a third aspect of the invention, in the tactile sensation providing apparatus according to the first aspect, the control unit controls the tactile sensation providing unit so that, in the case where, when the contact is detected by the contact detection unit, the edge of the input area has already been displayed on the display unit and the position of the cursor cannot be moved based on the contact, the second tactile sensation is provided.

According to the present invention, the results of process performed in response to the operation by the operator can be surely notified in a mode that is easy to be recognized by the operator.

BRIEF DESCRIPTION OF DRAWINGS

FIG. 4 is a flowchart illustrating a process of the tactile sensation providing apparatus according to the first embodiment;

FIG. 7 is a flowchart illustrating a process of the tactile sensation providing apparatus according to the third embodiment.

DESCRIPTION OF EMBODIMENTS

Figure 1:
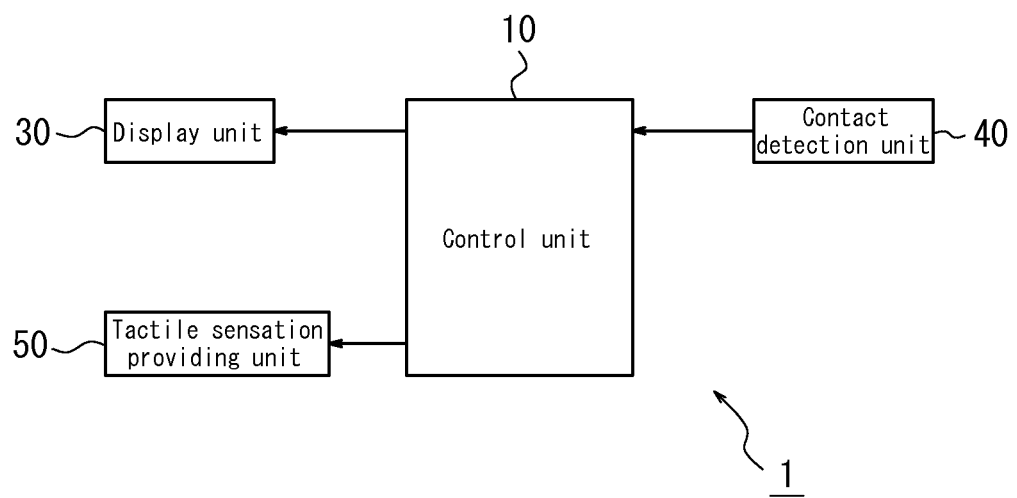
FIG. 1 is a block diagram illustrating a schematic configuration of a tactile sensation providing apparatus according to a first embodiment.

Some of the recent electronic devices have a function (or a part of the function) that is almost the same as that of an operating system (OS) mounted on a personal computer (PC). In such an electronic device, even if the electronic device is a compact type such as a mobile phone, it can be operated almost in the same manner as PC when the operator inputs characters.

In the case of a compact mobile terminal such as a mobile phone, its housing is also compact, and thus many switches such as keys and buttons cannot be provided on the body. Therefore, for a mobile terminal, although an input method is different from PC, the operator moves a cursor with a cursor key (direction key) and the like and presses each key such as characters, thereby displaying characters on a display unit or deleting the displayed characters (including numbers, figures, symbols, spaces and breaks) with a delete key. That is, if the operator understands the basic operation of PC with OS, he/she may often intuitively understand the basic operation of such an electronic device.

Furthermore, in some input modes of electronic devices, an auto repeat is performed in response to a long-press operation of a key. For example, when an auto repeat function is executed in an electronic device, the first character is displayed first at the moment when the operator presses a key of a predetermined character, and thereafter, when the key is held down, the same character is continuously and sequentially displayed. Note that the "auto repeat" is also referred to as "key repeat," which is a function by which, when the same key is pressed for a certain period of time, a corresponding character is continuously and sequentially input multiple times, not only once. Moreover, a "long press" is an operation by which the state where the same key and the like is pressed is kept for a predetermined period of time.

Since it is troublesome for the operator to press the same key many times, with the auto repeat, the operator can obtain, while holding down the key, the same effect as in the case where the same key is pressed many times. This auto repeat is not limited to the case where the operator inputs characters and, for example, when the operator presses a cursor key long during input of characters, he/she can move a cursor greatly. With respect to the above-described electronic device having a touch panel, an electronic device that detects a contact by a long press operation by the operator to a touch panel and thus can perform the auto repeat has been widely used.

Furthermore, when characters are input, they are input in a predetermined area in most cases. Such character input areas vary in specification. For example, in some cases, setting is made so that characters can be input only in the area displayed on the display unit, that is, characters cannot be input beyond the area displayed on the display unit. In such a setting, for the area in which characters and the like have already been input (hereinafter simply referred to as "input area"), the entire area is displayed on the display unit. Therefore, in such a setting, all of the characters that have been already input in the input area are displayed on the display unit, and thus there is no character that has already been input and is not displayed on the display unit.

However, when characters are generally input, there are many cases where setting is made so that characters can be input beyond the area displayed on the display unit. In such a case, the input area may be greater than the area displayed on the display unit. In such a setting, the characters input in the area beyond the area displayed on the display unit are not displayed on the display unit. Thus, the characters displayed on the display unit are not always all of the characters that have been input in the input area, and characters that have been already input but not displayed on the display unit may exist. Therefore, in such a setting, in order to recognize where is the end of the character string that has been input in the input area, the operator needs to display the end of the input area by operation such as moving a cursor, and to confirm.

In this case, if a long character string has been input in the input area, for example, the operator may perform operation such as a long press of a cursor key to move the cursor, thereby displacing the portion of the input area displayed on the display unit and displaying the edge of the input area (i.e. the end of the character string). In this case, "the display is displaced" means that the content displayed is sequentially moved or "scrolled", for example, character by character. In the case of such an operation, when the character string in the input area is made of different characters, since different characters are displaced on the display unit while the cursor is moved, the operator can recognize that the portion of the input area that is displayed is displaced.

However, in the case where the characters in the input area are a character string made of the same or similar characters, even if the portion of the input area displayed on the display unit is displaced by moving the cursor, the characters in the input area may seem to have not been displaced. In this case, it is difficult for the operator to recognize that the portion of the input area displayed on the display unit is being displaced. Therefore, it is difficult for the operator, while pressing the cursor key long, to determine whether or not the character string displayed on the display unit reaches the end of the character string that has been input in the input area.

Figure 8A:
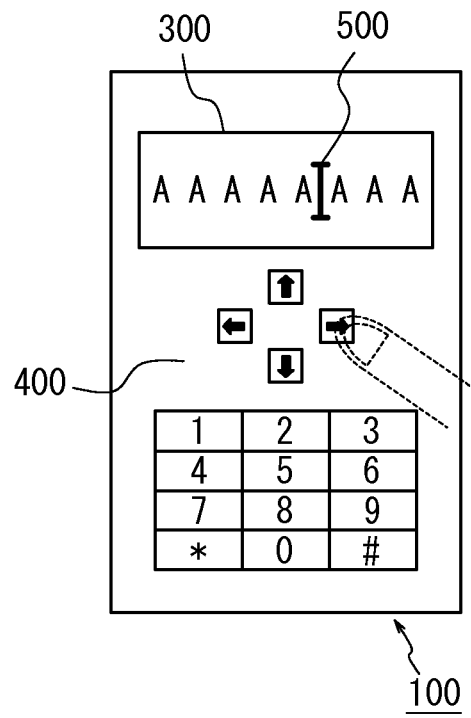
FIGS. 8A and 8B are schematic diagrams illustrating a conventional electronic device.

For example, as illustrated in FIG. 8A, an example where the same characters of A have been previously input in the input area of the input apparatus 100 will be described. In the input apparatus 100, the operator performs operation of pressing each of keys constituting the operation key unit 400, thereby displaying the input characters on the display unit 300 and moving the cursor 500 back and forth. Note that, although only eight characters of A are displayed on the display unit 300 illustrated in FIG. 8A, actually eight or more characters of A have been previously input therein. In such circumstances, as illustrated in FIG. 8A, the operator can move the cursor 500 from left to right by pressing the "right" cursor key of the operation key unit 400 long or more than once.

Figure 8B:
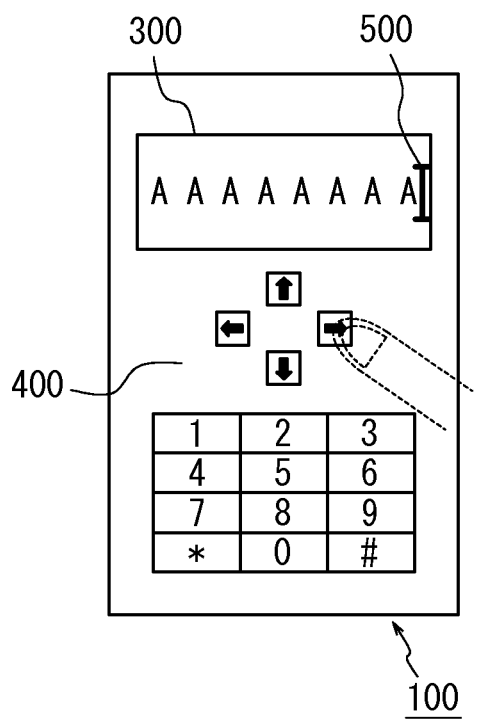

FIG. 8B illustrates a state where the operator performs the above described operation, thus the cursor 500 sequentially moves and reaches the right edge of the display unit 300. As illustrated in FIG. 8B, when the right cursor key is further pressed long or pressed more than once in the state where the cursor 500 reaches the right edge of the display unit 300, it is difficult for the operator to determine whether or not the cursor 500 reaches the edge of the input area (i.e., the end of the character string of A). As described above, in this case, since eight or more characters of A have been input in the input area, in the state illustrated in FIG. 8B, the cursor 500 does not reach the edge of the input area yet, and the portion of the input area displayed on the display unit 300 may be in the course of being displaced.

As illustrated in FIG. 8B, if the operator takes enough time to press the right cursor key long or more than once, the cursor 500 may reach the edge of the input area (i.e., the end of the character string of A) after a while. However, it is yet difficult for the operator to recognize the moment when the cursor 500 reaches the edge of the input area.

Thus, for example, in FIG. 8B, when the cursor 500 reaches the edge of the input area while the right cursor key is pressed long or more than once, the display mode of the element displayed on the display unit 300 may be changed or sound may be output. However, a measure to notify to the operator with sound may not be useful in loud environments. Furthermore, even if a display mode of elements displayed on the display unit 300 is changed, especially for a mobile terminal, the operator may operate it while doing other things, thus he/she may not pay attention to the display unit.

Therefore, the present invention has been conceived in light of the above circumstances and provides a tactile sensation providing apparatus capable of surely notifying the operator of the results of the process performed in response to the operation by the operator in a mode that is easy to be recognized by the operator.

First Embodiment

The following describes a first embodiment of the present invention with reference to the drawings.

FIG. 1 is a block diagram illustrating a schematic configuration of a tactile sensation providing apparatus according to the first embodiment. As illustrated in FIG. 1, the tactile sensation providing apparatus 1 according to the present embodiment has a control unit 10, a display unit 30, a contact detection unit 40 and a tactile sensation providing unit 50.

The control unit 10 is a processor that controls and manages the whole tactile sensation providing apparatus 1 by controlling each function unit constituting the tactile sensation providing apparatus 1. Among the controls by the control unit 10, those related to the present embodiment will be described below.

The display unit 30 displays an object such as, for example, a push button switch (push type button switch) as an image. This object is an image that suggests an area to be contacted on the contact detection unit 40 to the operator. Furthermore, a push button switch is a button, a key and the like (hereinafter simply referred to as "key and the like") used by the operator for operation such as input of characters and movement of a cursor. The display unit 30 is configured using, for example, a liquid crystal display panel (LCD), an organic EL display panel and the like. In the present embodiment, the display unit 30 displays, on a predetermined portion, the above described input area and cursor.

The contact detection unit 40 is normally disposed on the front face side of the display unit 30, and detects a contact by an operator's finger, a stylus pen and the like (hereinafter simply referred to as a "contacting object") to an object displayed on the display unit 30 on a corresponding contact face of the contact detection unit 40. Furthermore, when the contact detection unit 40 detects the contact position, it notifies the detected contact position to the control unit 10. As the contact detection unit 40, for example, a touch sensor configured using a resistive film type, a capacitive type, an optical type and the like may be used.

The tactile sensation providing unit 50 is configured using, for example, a piezoelectric vibrator and the like, and vibrates the contact detection unit 40. The tactile sensation providing unit 50 generates a vibration in a predetermined pattern, thereby providing a tactile sensation to the contacting object in contact with the contact detection unit 40. In the present embodiment, the tactile sensation providing unit 50 generates a vibration based on a drive signal supplied from the control unit 10. That is, in the present embodiment, the control unit 10 controls the tactile sensation providing unit 50 so that a vibration in a predetermined mode is generated.

Figure 2:
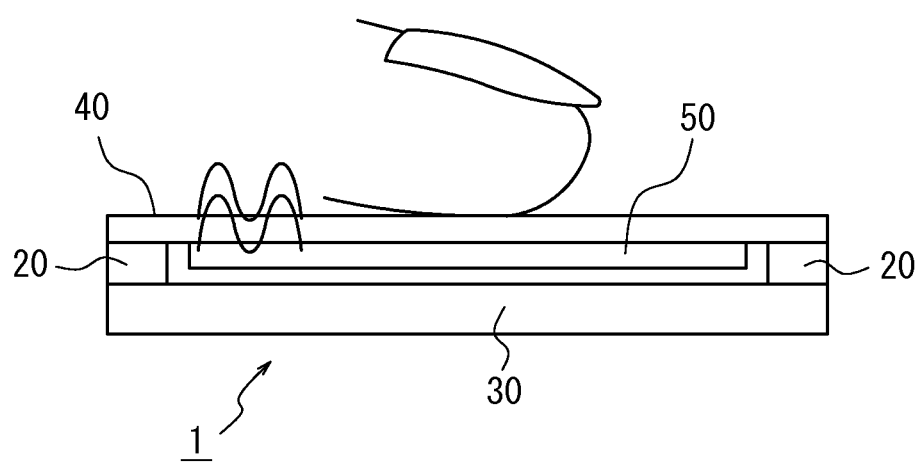
FIG. 2 is a diagram illustrating an example of a partial mounting structure of the tactile sensation providing apparatus according to the first embodiment.

FIG. 2 is a cross sectional view of a certain part illustrating an example of a mounting structure of the display unit 30, the contact detection unit 40 and the tactile sensation providing unit 50 of the tactile sensation providing apparatus 1 illustrated in FIG. 1.

FIG. 2 illustrates a state where, when the operator touches the object such as a key displayed on the display unit 30, he/she touches the contact detection unit 40 with his/her finger on a position corresponding to the position on which the object is displayed. As described above, the contact detection unit 40 detects a contact by the contacting object, thereby notifying the position of the contact to the control unit 10. Alternatively the control unit 10 may obtain the position of the contact by the contacting object detected by the contact detection unit 40.

In the contact detection unit 40 illustrated in FIG. 2, the surface member having a contact face is configured using, for example, a transparent film or glass, and the back member is configured using glass or acrylic. Furthermore, the contact detection unit 40 is held onto the display unit 30 via an insulator 20 formed by an elastic member. Based on the device structure, the contact detection unit 40 may be held by a housing and the like. The tactile sensation providing unit 50 vibrates the contact face of the contact detection unit 40 at an appropriate timing and provides a tactile sensation to the contacting object. Thus, the tactile sensation providing unit 50 is disposed, so that it contacts, for example, the contact detection unit 40, to allow transmission of a vibration to the contact detection unit 40. Alternatively, the tactile sensation providing unit 50 may vibrate the housing and the like to indirectly transmit a vibration to the contact detection unit 40. The vibration generated by the tactile sensation providing unit 50 is controlled by the control unit 10 based on a various conditions. Control of provision of a tactile sensation by the control unit 10 will be described later.

Next, the relationship between the input area of the tactile sensation providing apparatus 1 according to the present embodiment and the portion of the input area displayed on the display unit 30 will be described.

Figure 3:
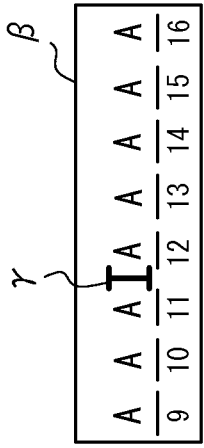
FIG. 3 is a diagram illustrating a relationship between a character string that has been input in an input area of the tactile sensation providing apparatus according to the first embodiment and the portion displayed on the display unit.

FIG. 3 illustrates a relationship, in the tactile sensation providing apparatus 1, between the character string that has been input in the input area and the portion of the input area displayed on the display unit 30. In the present embodiment, description is given on the assumption that the tactile sensation providing apparatus 1 is set so that characters can be input beyond the area displayed on the display unit 30. That is, as described above, the case where the input area can be larger than the area displayed on the display unit 30 will be described.

In the example illustrated in FIG. 3, in the input area α, twenty A's have been previously input. Each A is underlined and numbers one through 20 are assigned under each of the underlines. These underlines and numbers are given only for explanation, and are not needed to be actually displayed on the display unit 30. In FIG. 3, the underline provided to each A indicates that one character is input in the area where the underline is provided. Furthermore, the numbers assigned under each underline are given, for convenience, to allow easy distinction among twenty A's.

Moreover, as described above, in the example illustrated in FIG. 3, the input area α is larger than the area displayed on the display unit 30, thus it is not possible to display all of the characters in the input area α on the display unit 30. That is, in FIG. 3, although the input area α means an area in which characters and the like have been already input, it should be noted that this is a virtual area.

In FIG. 3, the portion of the input area α (actually) displayed on the display unit 30 is represented as β, which is abbreviated to "display area β" as appropriate. That is, the display area β is a predetermined portion that partially displays the input area on the display unit 30. In addition, FIG. 3 also shows a state where a cursor γ is displayed on the display area β. The cursor γ may be, in addition to the one illustrated in FIG. 3, of any type.

As illustrated in FIG. 3, on the display area β of the display unit 30 of the tactile sensation providing apparatus 1, only eight characters (e.g. from 9th to 16th A's) can be displayed. Therefore, even if, for example, from 1st to 20th A's have been already input in the input area α, as illustrated in FIG. 3, 17th and following A's are not displayed on the display unit 30. In order to display 17th and following A's on the display area β, the operator moves the cursor γ to behind 16th A and further performs operation of sequentially moving the cursor γ to the right.

Next, the process performed by the tactile sensation providing apparatus 1 according to the present embodiment will be described. In the present embodiment, the tactile sensation providing apparatus 1 notifies the operator of the results of the process performed in response to the operation by the operator by providing a tactile sensation. Therefore, in the following description, emphasis is put on provision of a tactile sensation. Since arbitrary process relating to movement of a cursor or displacing of a display area by moving the cursor can be taken, the detailed description is omitted.

Figure 5A:
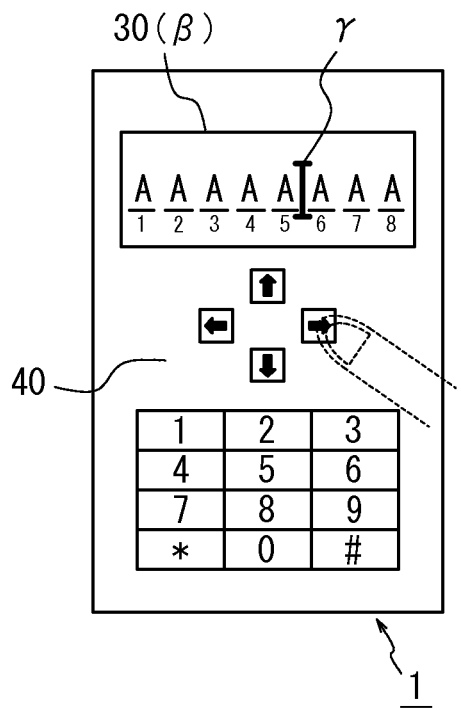
FIGS. 5A, 5B, 5C and 5D are diagrams illustrating a concrete example of the process of the tactile sensation providing apparatus according to the first embodiment.

FIG. 4 is a flowchart illustrating a process according to the present embodiment. Note that, when performing the process according to the present embodiment, as illustrated in FIG. 3, for example, more characters than that can be displayed on the display area β have been input in the input area α. Furthermore, when performing this process, in order to detect an operation of moving a cursor by the operator, as illustrated in FIG. 5A, for example, an object of cursor key for moving a cursor is displayed on the display unit 30. In this case, as illustrated in FIG. 5A, the position where the object of cursor key is displayed on the display unit 30 is preferably a position that does not overlap with the display area β. This is because when the operator operates the cursor key, the finger and the like for performing the operation may not cover the display of the display area β. In addition, as illustrated in FIG. 5A, the cursor γ is displayed on the display area β. Note that, in the present embodiment, if the cursor can be moved, it is not essential to display an object of cursor key on the display unit 30.

As illustrated in FIG. 4, when the process according to the present embodiment is started, the control unit 10 determines whether or not a contact is detected by the contact detection unit 40 located on the position corresponding to the position where the cursor key is displayed on the display unit 30 (step S11). Note that, in this case, the detected "contact" is a contact by the operation by the operator. Hereinafter detection of a contact by the contact detection unit 40 located on the position corresponding to the position where an object is displayed on the display unit 30 is abbreviated, as appropriate, to "a contact is detected on the position of the object" or "being in contact with the object".

When a contact is detected on the position of the cursor key in step S11, the control unit 10 moves, in the input area, the cursor γ in the direction corresponding to that suggested by the cursor key (step S12). Note that, at this point of time, since the cursor γ is virtually moved in the input area, display on the display unit 30 is not changed yet.

After the cursor γ is moved in step S12, the control unit 10 determines whether or not the display area β is displaced as the position of the cursor γ is moved (step S13). In step S13, when the cursor γ stays at the edge of the display area β from the beginning, if the cursor γ is moved further, the display area β is displaced. On the other hand, in step S13, when the cursor γ stays at the position which is not the edge of the display area β from the beginning, even if the cursor γ is further moved for one character, the cursor γ moves within the display area β, and thus the display area β is not displaced.

If the display area β is not displaced as the position of the cursor γ is moved in step S13, the control unit 10 controls, at this point of time, the display unit 30 so that the position of the cursor γ is moved and displayed on the display unit 30, and the process returns to step S11.

After the process so far is performed, as illustrated in FIG. 5A, for example, the operator can move the cursor γ in the display area β by touching the object of the cursor key on the contact detection unit 40.

Figure 5B:
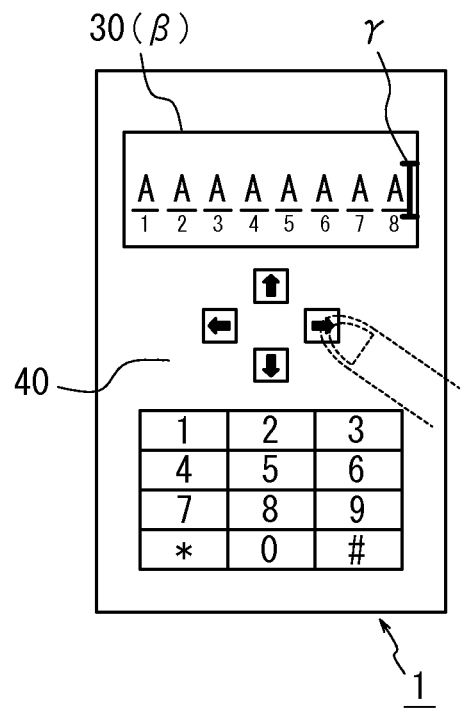

FIG. 5A illustrates a state where the operator operates (touches) the right arrow cursor key, thereby moving the cursor γ from the 1st A to after the 5th A in the display area β. The operator performs the same operation and can move the cursor γ, as illustrated in FIG. 5B, for example, to after the 8th A in the display area β. In the present embodiment, a tactile sensation is not provided based on such an operation.

On the other hand, in step S13, when the display area β is displaced as the position of the cursor γ is moved, the control unit 10 determines whether or not the edge of the input area α is displayed as the display area β is displaced (step S14). In step S14, when the cursor γ precedes the edge of the input area α by one character from the beginning, if the cursor γ is moved further, the edge of the input area α may be displayed. On the other hand, in step S14, when the cursor γ precedes the edge of the input area α by two or more characters, even if the cursor γ is moved by one character and the display area β is displaced, the edge of the input area α is not displayed yet.

When the edge of the input area α is not displayed in step S14, the control unit 10 controls the tactile sensation providing unit 50 so that first tactile sensation is provided (step S15). Note that, in this case, the "first tactile sensation" may be a tactile sensation caused by a relatively weak vibration or a relatively short (e.g. moment) vibration, for example, or any other arbitrary type of tactile sensation as long as distinguished from other tactile sensations. In addition, at this point of time, the control unit 10 controls the display unit 30 so that the position of the cursor γ is moved on the display unit 30 and the display area β is displaced and displayed as well, and the process returns to step S11.

Thus, in the present embodiment, the control unit 10 controls the display unit 30 so that the position of the cursor γ is moved based on the contact detected by the contact detection unit 40 and, based on the movement of the position of the cursor γ, the portion β of the input area α displayed on the display unit 30 is displaced as well. Furthermore, in the present embodiment, the control unit 10 controls the tactile sensation providing unit 50 so that, when the portion β of the input area α displayed on the display unit 30 is displaced as the position of the cursor γ is moved, it provides the first tactile sensation.

Figure 5C:
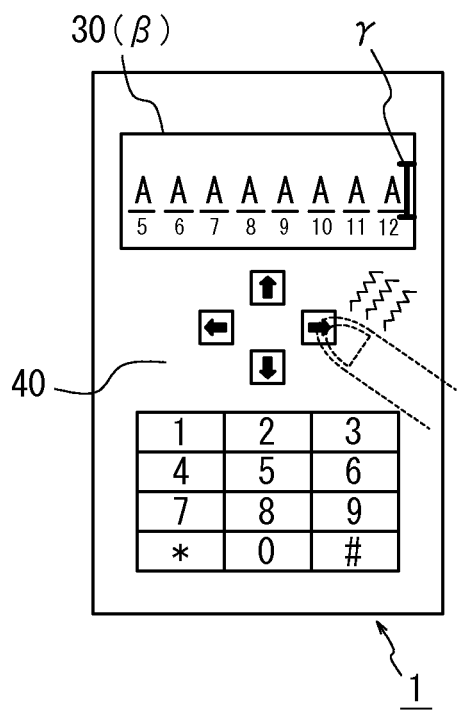

After the process so far is performed, as illustrated in FIG. 5C, for example, even if the cursor γ stays at the edge of the display area β, the operator can scroll the display area β by touching the cursor key object on the contact detection unit 40. In addition, at this time, the operator can surely recognize that the display area β is displaced as the cursor γ is moved, through the tactile sensation provided.

FIG. 5C illustrates a state where the operator operates (touches) the right arrow cursor key and moves the cursor γ to after the 12thA, which locates beyond the 8thA in the display area β. Furthermore, in FIG. 5C, a wavy line illustrated near the operator's finger operating the right arrow cursor key shows that the first tactile sensation is provided to the operator's finger. Each time the operator operates in the same manner and moves the cursor γ in the display area β up to the 19th A, he/she can recognize that the display area β is displaced as the cursor γ is moved, through the tactile sensation provided.

On the other hand, when the edge of the input area α is displayed in step S14, the control unit 10 controls the tactile sensation providing unit 50 so that a second tactile sensation is provided (step S16). Note that, in this case, the "second tactile sensation" should be a tactile sensation different from the first tactile sensation, and caused by, for example, a relatively strong vibration or a relatively long (longer than a moment, for example) vibration. Also in this case the second tactile sensation may be any tactile sensation if it is a tactile sensation of a type that can be distinguished from the first tactile sensation or the other tactile sensations described later. Furthermore, the control unit 10, at this point of time, controls the display unit 30 so that the position of the cursor γ is moved on the display unit 30 and the display area β is displaced and the edge of the input area α (i.e. the end of the character string) is displayed as well, and the process returns to step S11.

Thus, in the present embodiment, the control unit 10 controls, when the edge of the input area α is displayed on the display unit 30 as the portion β of the input area α displayed on the display unit 30 is displaced, the tactile sensation providing unit 50 so that the second tactile sensation different from the first tactile sensation is provided.

Figure 5D:
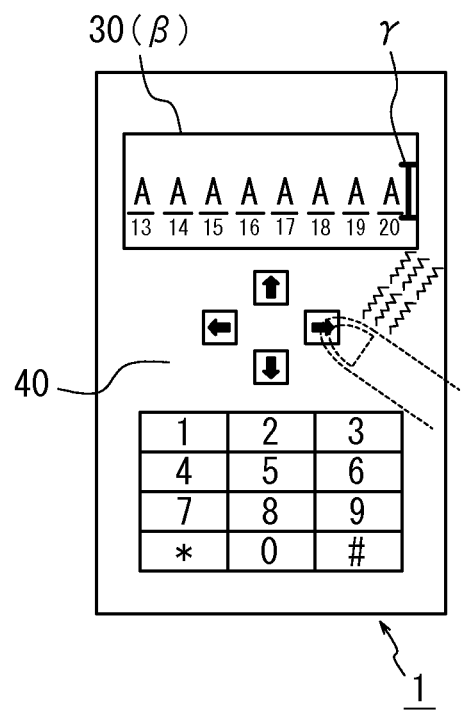

After the process so far is performed, as illustrated in FIG. 5D, for example, when the cursor γ reaches the edge of the input area α, even if the operator touches further the cursor key object on the contact detection unit 40, he/she cannot scroll the display area β. In addition, at this time, the operator can surely recognize that the cursor γ reaches the edge of the input area α as the display area β is displaced, through the tactile sensation provided.

FIG. 5D illustrates a state where the operator operates (touches) the right arrow cursor key, thereby moving the cursor γ to after the 20thA, that is, to the edge of the input area α in the display area β. Furthermore, in FIG. 5D, a wavy line illustrated near the operator's finger operating the right arrow cursor key shows that the second tactile sensation different from the first tactile sensation is provided to the operator's finger. Thus the operator can recognize that the cursor γ reaches the end of the character string that has been input in the input area α through provision of a tactile sensation that is different from those provided before.

Thus, according to the present embodiment, when the position of the cursor γ is moved by the operation by the operator, the case where the display area β is displaced without displaying the end of the character string that has been input in the input area α and the case where the end of the character string that has been input in the input area α is displayed by displacing the display area β can be clearly distinguished and recognized by the operator. Therefore, according to the present embodiment, the results of the process performed in response to the operation by the operator can be surely notified to the operator in an easy to be recognized mode.

Second Embodiment

Next, the second embodiment of the present invention will be described.

According to the second embodiment, in the tactile sensation providing apparatus 1 according to the above described first embodiment, the process by the control unit 10 is modified. In more detail, in the tactile sensation providing apparatus 2 according to the second embodiment, the process on and after step S13 illustrated in FIG. 4 is modified in the tactile sensation providing apparatus 1 according to the first embodiment. Other than the point described above, the tactile sensation providing apparatus 2 according to the second embodiment can be realized by the structure and the process that are basically the same as those of the tactile sensation providing apparatus 1 described in the first embodiment. Thus the same descriptions as those described in the first embodiment are omitted.

In the above described first embodiment, when the position of the cursor γ is moved by the operation by the operator, if the end of the character string that has been input in the input area α is not displayed and the display area β is not displaced, no tactile sensation is provided. Thus, in the tactile sensation providing apparatus 2 according to the second embodiment, when the position of the cursor γ is moved by the operation by the operator, if the end of the character string that has been input in the input area α is not displayed and the display area β is not displaced, a third tactile sensation different from the first and the second tactile sensations is provided.

Figure 6:
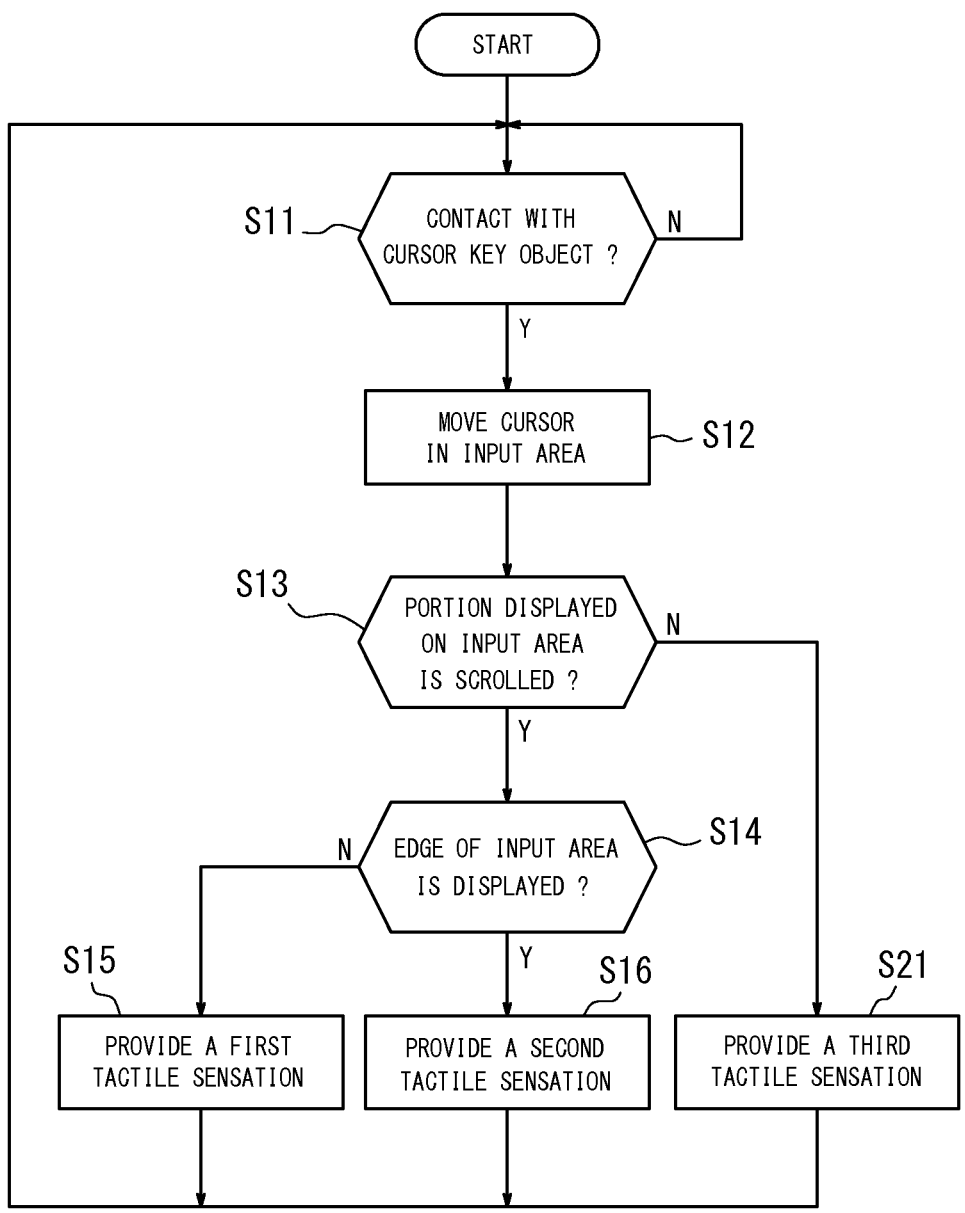
FIG. 6 is a flowchart illustrating a process of the tactile sensation providing apparatus according to the second embodiment.

FIG. 6 is a flowchart illustrating a process according to the second embodiment. In the process according to the second embodiment illustrated in FIG. 6, if the display area β is not displaced as the position of the cursor γ is moved in step S13 illustrated in FIG. 4, the control unit 10 controls the tactile sensation providing unit 50 so that a third tactile sensation is provided (step S21), and the process returns to step S11. Note that the "third tactile sensation" may be any tactile sensation if it is of a type that can be distinguished from the first or the second tactile sensation.

Therefore, in the second embodiment, the third tactile sensation may be a tactile sensation caused by, for example, a relatively weak vibration or a relatively short (e.g. a moment) vibration. In this case, the first tactile sensation may be a tactile sensation caused by, for example, a relatively weak vibration generated twice at short intervals, or a relatively short (e.g. a moment) vibration generated twice at short intervals. Furthermore, the second tactile sensation may be a tactile sensation caused by, for example, a relatively strong vibration or a relatively long (e.g. longer than a moment) vibration.

Thus, in the present embodiment, the control unit 10 controls, when the position of the cursor γ is moved without displacing of the portion β of the input area α displayed on the display unit 30, the tactile sensation providing unit 50 so that the third tactile sensation different from the first or the second tactile sensation is provided.

According to the present embodiment, when the position of the cursor γ is moved by the operation by the operator, the case where the display area β is displaced without displaying the end of the character string that has been input in the input area α, the case where the end of the character string that has been input in the input area α is displayed by displacing the display area β, and further, the case where the display area β is not displaced can be clearly distinguished and recognized by the operator. Therefore, according to the present embodiment, the results of the process performed in response to the operation by the operator can surely be notified to the operator in an easy to be recognized mode.

Third Embodiment

Next, the third embodiment of the present invention will be described.

According to the third embodiment, as with the second embodiment, in the tactile sensation providing apparatus 1 according to the first embodiment, the process by the control unit 10 is modified. In more detail, according to the third embodiment, in the tactile sensation providing apparatus 1 according to the first embodiment, process is further added after step S11 illustrated in FIG. 4. The tactile sensation providing apparatus 3 according to the third embodiment can be realized by the structure and the process that are basically overlapping those of the tactile sensation providing apparatus 1 described in the first embodiment. Thus the descriptions overlapping those described in the first embodiment are omitted.

In the above described first embodiment, the case where the end of the character string that has been input in the input area α is displayed from the beginning before the position of the cursor γ is moved by the operation by the operator is not defined. When the end of the character string that has been input in the input area α is displayed from the beginning, even if a contact with the cursor key object is further detected on the contact detection unit 40, the display area β cannot be displaced. Thus, in the third embodiment, when the end of the character string that has been input in the input area α is displayed from the beginning when the contact with the cursor key object is detected on the contact detection unit 40, and thus the position of the cursor γ cannot be moved any more, the second tactile sensation described in the first embodiment is provided.

FIG. 7 is a flowchart illustrating the process according to the third embodiment. In the process according to the third embodiment illustrated in FIG. 7, in step S11 illustrated in FIG. 4, when a contact is detected on the position of the cursor key, the control unit 10 determines whether or not the edge of the input area α is displayed already on the display area β and the cursor γ cannot be moved (step S31).

In step S31, when the edge of the input area α is not displayed on the display area β yet and the cursor γ can be moved, the control unit 10 performs the process on and after step S12. That is, when the edge of the character string that has been input in the input area α is not displayed before the position of the cursor γ is moved by the operation by the operator, the control unit 10 performs the process as with the first embodiment.

On the other hand, in step S31, when the edge of the input area α has already been displayed on the display area β and the cursor γ cannot be moved, the process transits to step S16 and the control unit 10 controls the tactile sensation providing unit 5 so that the second tactile sensation is provided. Thus, in the present embodiment, the control unit 10 controls, when the edge of the input area α is already displayed on the display unit 30 when a contact is detected by the contact detection unit 40 and based on the contact, the position of the cursor γ cannot be moved, the tactile sensation providing unit 50 so that the second tactile sensation is provided.

According to the present embodiment, when the end of the character string that has been input in the input area α is displayed from the beginning and the operator tries to move the position of the cursor γ, the operator can clearly recognize that the display area β cannot be displaced. Thus, the operator can clearly recognize that the end of the character string that has been input in the input area α is already displayed. Therefore, according to the present embodiment, the results of process performed in response to the operation by the operator can surely be notified to the operator in an easy to be recognized mode.

The present invention is not limited to the above described embodiments, and various modifications or changes may be made. For example, in the above described each embodiment, the aspect in which the object is displayed on the display unit 30 and the contact detection unit 40 detects a contact by the operator is described. However, the present invention is not limited to such an aspect, and for example, an aspect in which the apparatus does not have a display unit 30 and the object is printed directly on the contact face of the contact detection unit 40 with ink and the like may be assumed.

In the above described each embodiment, as a preferred example of providing a tactile sensation, a contact is detected by a touch sensor and if a predetermined condition is satisfied, a predetermined tactile sensation is provided. However, in the present invention, the contact detection unit 40 is not limited to the configuration in which a contact is detected by a touch sensor. For example, instead of a configuration in which an object such as a key and the like is displayed on the display unit 30, a configuration in which a tactile sensation is provided to the contacting object through a mechanical push button switch or a key board can be assumed. That is, the apparatus may be configured such that, a vibration by the tactile sensation providing unit 50 is transmitted to a mechanical type push button switch, and when such a mechanical type push button switch is pressed, if a predetermined condition is satisfied, a predetermined tactile sensation is provided to the operator. In such a configuration, the contact detection unit 40 may be a normal switch, a keyboard and the like, and it is not essential to adopt a touch sensor.

In the above described each embodiment, as a typical example of displacing the display area β, an aspect in which the position of the cursor γ is laterally moved in the input area α is described. However, in the present invention, the movement of the cursor γ is not limited to a lateral direction and, for example, a longitudinally input character string may be longitudinally displaced in the display area β as the cursor γ moves in a longitudinal direction.

In the above described each embodiment, an example of input of alphabetical letters in the input area α is described. In this case, not only characters and the like but also various symbols and, further a space may be input in the input area α. In addition, a colored space may be input in the input area α.

In the above described each embodiment, the first to third tactile sensations are adopted, however, these tactile sensations may respectively be a "tactile sensation" that can be distinguished by the operator, and any one of the tactile sensations may be a tactile sensation producing no vibration.

In the above described embodiment, the contact detection unit 40 is used to detect a contact with the contact face of the contact detection unit, however, instead of the contact detection unit 40, or with the contact detection unit 40, the apparatus may be configured to have a press detection unit configured to detect a press on the contact face by the operator's operation.

This press detection unit detects a press when the user executes an operation to the contact face and is, for example, configured using a strain gauge sensor, an element such as a piezoelectric element and the like that experiences a change in physical or electrical characteristics (strain, resistance, voltage and the like) in response to press. When the press detection unit 40 is configured using a piezoelectric element, for example, in the piezoelectric element of the press detection unit, the magnitude of the voltage (voltage value (hereinafter referred to as data based on pressure)), which is an electrical characteristic, changes in accordance with the magnitude of the load (force) of the press on the contact face (or the speed at which the magnitude of the load (force) changes (acceleration)). When the data based on press is equal to or greater than a predetermined threshold, the control unit 10 determines that a contact by the operator has been performed and controls so that a predetermined process is performed.

In this case, the control unit 10 obtains the data based on press when the data based on press is notified to the control unit 10 from the press detection unit or when the control unit 10 detects the data based on press by the press detection unit. That is, the control unit 10 obtains the data based on press on the contact face from the press detection unit. Note that, instead of a voltage value, the data based on press may be the magnitude of the load of the press, power, resistance and the like.

Such a press detection unit may be configured in accordance with the contact detection type of the contact detection unit 40. For example, when the contact detection unit 40 is a resistive film type, then a configuration without a strain gauge sensor, a piezoelectric element and the like may be configured by associating the magnitude of the resistance in accordance with the size of the contact area to the load (force) of the press on the contact face of the contact detection unit 40. Alternatively, if the contact detection unit 40 is a capacitive type, a configuration without a strain gauge sensor, a piezoelectric element and the like may be configured by associating the magnitude of the capacitance to the load (force) of the press on the contact detection unit 40.

Moreover, the tactile sensation providing unit 50 may be configured using any number of piezoelectric vibrators, providing a transparent piezoelectric element on the entire surface of the contact detection unit 40, or rotating an eccentric motor to rotate once per period of a drive signal. Note that the tactile sensation providing unit 50 may be configured to vibrate the contact detection unit 40 indirectly by causing the tactile sensation providing apparatus 1 to vibrate based on a vibration motor (eccentric motor) and the like, or to vibrate the contact detection unit 40 directly by arranging a piezoelectric element on the contact detection unit 40.

Note that the above described press detection unit and the tactile sensation providing unit 50 may be configured integrally. In particular, when the press detection unit and the tactile sensation providing unit 50 are configured using a piezoelectric element, these units may be configured as a press detection and tactile sensation providing unit that share a common piezoelectric element. The reason is that a piezoelectric element generates voltage when pressure is applied and deforms when voltage is applied.

The tactile sensation providing unit 50 may also be configured to generate a vibration by driving a piezoelectric element when the magnitude of the voltage (voltage value (data)) of the piezoelectric element that also serves as the pressure detection unit satisfies a predetermined threshold (when the contact detection unit 40 is pressed). When the magnitude of the voltage (voltage value (data)) of the piezoelectric element satisfies a predetermined threshold may be when the voltage value (data) reaches a predetermined standard value, the voltage value (data) exceeds the predetermined standard value, or a voltage value (data) equal to the predetermined standard value is detected.

In the above described embodiment, description was given on the assumption that the contact detection unit 40 is placed on top of the upper face of the display unit 30. It is not essential to configure the tactile sensation providing apparatus according to the present invention in such a manner, and the contact detection unit 40 may be spaced apart from the display unit 30. However, when the contact detection unit 40 is placed on top of the upper face of the display unit 30, it is easier for the operator to recognize the correspondence relationship between the image displayed and the vibration generated.

Furthermore, the display unit 30 and the contact detection unit 40 in the above described embodiment may be configured integrally by providing a common substrate having the functions of both a display unit and a contact detection unit. An example of such a device integrating the functions of both a display unit and a contact detection unit is a liquid crystal panel having a matrix of pixel electrodes, with a plurality of photoelectric conversion elements, such as photodiodes, regularly mixed therein. Such a device displays an image by a liquid crystal panel structure, and on the other hand, reflects a backlight for the liquid crystal display with the tip of the pen that touches the desired position on the surface of the panel for input, then the reflected light is received by the surrounding photoelectric conversion elements, thereby detecting the contact position.

REFERENCE SIGNS LIST

1: Tactile sensation providing apparatus
10: Control unit
20: Insulator
30: Display unit
40: Contact detection unit
50: Tactile sensation providing unit

The invention claimed is:

1. A tactile sensation providing apparatus, comprising:
a contact detection unit configured to detect a contact by a contacting object;
a tactile sensation providing unit configured to provide a tactile sensation to the contacting object in contact with the contact detection unit;
a display unit configured to display an input area in which a character is input and a cursor; and
a control unit configured to control the display unit so that a position of the cursor is moved based on the contact detected by the contact detection unit and a portion of the input area displayed on the display unit is displaced, wherein
the control unit controls the tactile sensation providing unit so that a first tactile sensation is provided when a portion of the input area displayed on the display unit is displaced as the position of the cursor is moved, and a second tactile sensation different from the first tactile sensation is provided when an edge of the input area is displayed on the display unit as the portion of the input area displayed on the display unit is displaced.

2. The tactile sensation providing apparatus according to claim 1, wherein
the control unit controls the tactile sensation providing unit so that, when the position of the cursor is moved without displacing of the portion of the input area displayed on the display unit, a third tactile sensation different from the first and the second tactile sensation is provided.

3. The tactile sensation providing apparatus according to claim 1, wherein
the control unit controls the tactile sensation providing unit so that, in the case where, when the contact is detected by the contact detection unit, the edge of the input area has already been displayed on the display unit and the position of the cursor cannot be moved based on the contact, the second tactile sensation is provided.

4. The tactile sensation providing apparatus according to claim 1, wherein
the input area has a total virtual area larger than an actual area displayed on the display unit, and
the edge of the input area is selectively displayed on the display unit under selected conditions.

5. The tactile sensation providing apparatus according to claim 1, wherein
the control unit configured to control the display unit so that the position of the cursor is moved based on the contact detected by the contact detection unit and the portion of the input area displayed on the display unit is displaced without an edge of the input area being displayed.

6. The tactile sensation providing apparatus according to claim 1, wherein
the control unit controls the tactile sensation providing unit to perform a first processing such that the first tactile sensation is provided when the portion of the input area displayed on the display unit is displaced as the position of the cursor is moved,
to perform a second processing such that the second tactile sensation different from the first tactile sensation is provided when the edge of the input area is displayed on the display unit as the portion of the input area displayed on the display unit is displaced, and
the control unit controls the tactile sensation providing unit to repeatedly perform the first processing until performing the second processing.

* * * * *